Dec. 11, 1928.
H. W. CARR
1,694,841
RECOVERING VALUES BY EVAPORATION
Filed April 30, 1927
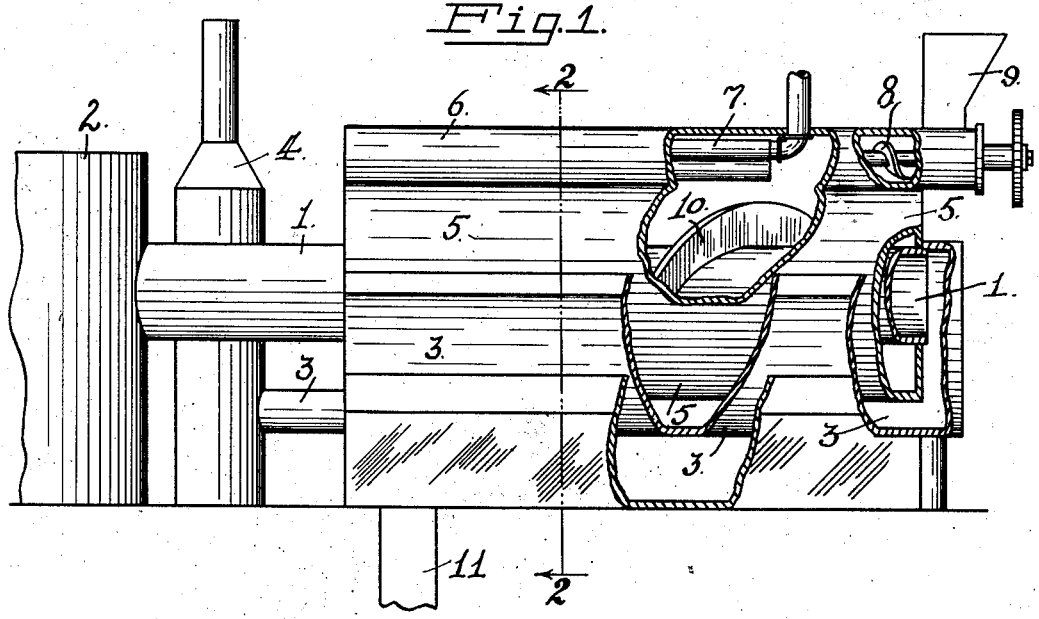
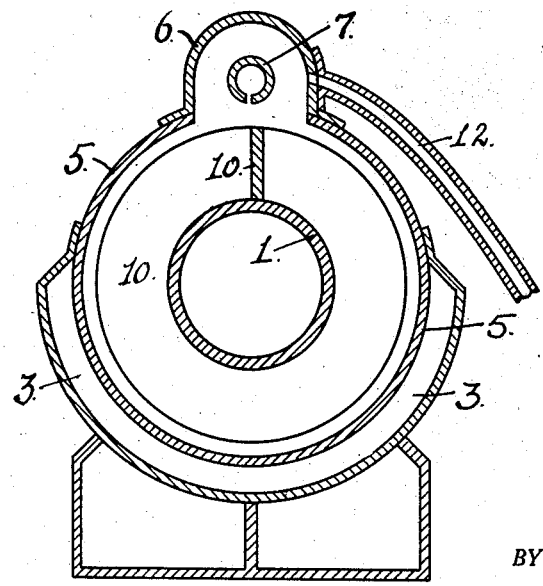
INVENTOR.
Henry W. Carr
BY
Booth & Booth
ATTORNEYS.

Patented Dec. 11, 1928.

1,694,841

UNITED STATES PATENT OFFICE.

HENRY W. CARR, OF SAN FRANCISCO, CALIFORNIA.

RECOVERING VALUES BY EVAPORATION.

Application filed April 30, 1927. Serial No. 188,050.

My invention relates to the art of treating materials by evaporation, for the recovery of their valuable residues, said invention being especially useful with solutions whose solids, under evaporation, crystallize out, and is further particularly intended for the recovery of salts from brines.

In this latter connection, for the sake of illustration and by way of example merely, I prefer to disclose my invention; but it must be understood that I do not confine myself to such use, since, although in the recovery of salts from brine advantages are present which mark a distinct improvement in the specific art, and which I shall herein specifically claim, I deem my invention of such scope as to entitle me to a more generic claim which shall include any solution or material, the residual content of which is crystallizable out under the operation and effect of my method.

In the art of recovering salts from brines, solar evaporation, commonly employed, has some disadvantages, which it is thought might be obviated by the substitution of artificial evaporation. But artificial evaporation, whether carried out by heat externally or internally applied, using steam or fire, as source of heat or under vacuum or pressure, atmospheric or otherwise, ordinarily means the use of some form of structure such as a drier or a furnace; and as such structure comprises tubes, pipes, shell and walls, with which the solution under treatment comes in contact, it is found in practice that such surfaces become coated and scaled to an extent which materially reduces the rate of evaporation, increases the cost of operation, requires time to clean them off, and especially, in case of a continuous treatment, seriously interferes with the desired effect.

When solids in solution first form under the influence of evaporation the crystals or other particles are of such a fineness as to cause them to adhere the more readily and firmly to surfaces with which they come in contact. This fact accentuates the objection to the otherwise apparent advantage which artificial evaporation possesses.

The object of my invention is to overcome this difficulty of using artificial evaporation, to the end that approved and efficient forms of evaporators may be economically employed, whether operating under the batch system of treatment or under the continuous system. I have found that when liquid containing materials having crystallizable residues are evaporated in the presence of previously obtained residual particles of the same nature as those which are sought by said treatment, the newly formed particles, as they crystallize out of the material, attach themselves to and build upon the previously obtained particles, as nuclei, and do not, therefore, attach themselves to and coat the structural surfaces of the evaporator; and, incidentally, this desirable effect may be heightened by agitation, first, because of scouring action, and second, because of presenting more extensively and perfectly the nuclear particles to the contact of the forming particles.

Specifically, in the case of treating brines, the crystals of salt formed by evaporation, attach themselves, practically exclusively, to and build up on the nuclear salt crystals in whose presence the treatment is carried on, and the structural surfaces of the apparatus are left clean.

My invention, therefore, may be stated to consist, broadly, in recovering desired crystallizable residues from liquid containing materials by evaporating the liquid in an artificially heated region, in the presence of previously obtained residues of like nature to those sought to be recovered; and more specifically, it consists in recovering salts from brines by evaporating said brines in an artificially heated region, in the presence of previously obtained salts of like nature to those sought to be recovered, whereby said previously obtained salts serve as nuclei for those formed by said evaporation.

In carrying out my invention I prefer to proceed substantially as follows, using terms of brine and the recovery of its salts, as an example.

I first place in the region of evaporation a quantity of salt previously produced from a brine of the same nature as the brine about to be treated. This salt so placed—the quantity of which is such as may readily be determined for the desired result—will form a bed in said region. Said region may be under vacuum or pressure, atmospheric or otherwise, and heat is applied to said region until the temperature of the bed of salt therein is raised to a degree which will cause flash evaporation of brine dropped upon it. When the bed is sufficiently heated the brine is dropped upon it and evaporation is instantaneous, the freshly formed salt crystals adhering to the nuclear crystals of the bed. As the salt increases in volume, such portion is removed as will still leave a nuclear bed for fresh brine to be dropped upon it. Any vapor, if of value, may, of course, be drawn off and condensed.

Though I have described as the preferred method, the dropping of the brine upon a hot bed of previously obtained salt, under conditions to secure flash evaporation, I do not confine myself to this plan, for the evaporation may be conducted under other conditions, both as to the nature of the heating structure, and the operation carried out therein.

By this process, it will be seen, artificial evaporation may be used without coating or scaling the surfaces of any structure, and, further, said process permits the production of any size crystals desired, by adjustment of time and speed of handling.

The accompanying drawing, to which reference is made, illustrates an apparatus in the form of a furnace, in which the method may be carried out:—

Fig. 1 is a side view, partly in section, of a furnace.

Fig. 2 is a cross section of the same on the line 2—2 of Fig. 1.

1 is a heating flue having communication at one end with a source of heat 2, and at the other end with a return flue 3 leading to a stack 4.

5 is a shell enveloping, spaced from, and forming an air-tight evaporating chamber around the flue 1.

6 is a cap-shell overlying and communicating lengthwise through the top of the shell with the upper portion of the treating chamber.

In one end of the cap shell is housed a slotted feed pipe 7 adapted to drop the brine to be evaporated into the evaporating chamber.

In the other end of the cap shell is a screw conveyer 8 fed by a hopper 9, and adapted to initially supply the salt previously produced from a brine of the same nature as the brine to be treated which said salt forms a hot bed upon which the brine to be treated is dropped.

Within the evaporating chamber is a rotatable member 10 to advance to the outlet 11 the finished increment of salt in sufficient quantity to still leave a nuclear bed for fresh brine to be dropped upon it. 12 is a vapor discharge from the cap-shell 6.

I claim:—

1. The method of recovering crystallizable residual values from liquid-containing materials which comprises dropping the material, in an artificially heated region, upon a hot bed of previously obtained residues of like nature with those to be recovered, under conditions adapted to secure flash evaporation of the liquid content of said material by the heat of said residues.

2. The method of recovering salts from brines, which comprises dropping the brine, in an artificially heated region, upon a hot bed of previously obtained salts of like nature with those to be recovered, under conditions adapted to secure flash evaporation of the brine by the heat of said salts.

3. The method of recovering crystallizable residual values from liquid-containing materials which comprises dropping said material upon a hot bed of previously obtained residues of like nature with those to be recovered, said hot bed being of such temperature as to evaporate the liquid content of said material.

4. The method of recovering salts from brines, which comprises dropping the brine upon a hot bed of previously obtained salts of like nature with those to be recovered, said hot bed being of such temperature as to evaporate the liquid content of the brine.

In testimony whereof I have signed my name to this specification.

HENRY W. CARR.